United States Patent [19]

Waldmann et al.

[11] Patent Number: 5,555,136
[45] Date of Patent: Sep. 10, 1996

[54] INTERIOR REARVIEW MIRROR FOR MOTORIZED VEHICLES

[75] Inventors: Bernd Waldmann, Esslingen; Djuanarto Kusuma, Rödental, both of Germany

[73] Assignee: Reitter & Schefenacker GmbH & Co. KG, Esslingen, Germany

[21] Appl. No.: 495,911

[22] Filed: Jun. 28, 1995

[30] Foreign Application Priority Data

Jun. 28, 1994 [DE] Germany .............................. 9410387 U

[51] Int. Cl.⁶ .............................. G02B 7/182; G01J 1/20; B60R 1/04
[52] U.S. Cl. ....................... 359/871; 359/872; 250/203.4; 250/208.4; 454/75; 248/481; 236/91 C
[58] Field of Search ..................... 359/838, 871, 359/872, 603, 604; 250/203.3, 203.4, 208.4, 215; 454/75, 900; 248/479, 481; 236/91 C

[56] References Cited

U.S. PATENT DOCUMENTS

| 4,701,022 | 10/1987 | Jacob | 359/603 |
| 4,760,772 | 8/1988 | Horiguchi et al. | 250/208.4 |
| 4,930,742 | 6/1990 | Schofield et al. | 359/871 |
| 5,065,015 | 11/1991 | Horiguchi et al. | 250/203.4 |
| 5,117,744 | 6/1992 | Zimmer et al. | 250/203.4 |

*Primary Examiner*—Ricky D. Shafer
*Attorney, Agent, or Firm*—Robert W. Becker & Associates

[57] ABSTRACT

An interior rearview mirror for a motorized vehicle has a mirror housing with a mirror member and a mirror support connected to the mirror housing. At least one sensor for sensing solar radiation entering the interior of the motorized vehicle through the windshield is provided. The sensor is coupled to the control unit of an air conditioning device of the motorized vehicle.

8 Claims, 2 Drawing Sheets

INTERIOR REARVIEW MIRROR FOR MOTORIZED VEHICLES

BACKGROUND OF THE INVENTION

The present invention relates to an interior rearview mirror for motorized vehicles comprising a mirror support to which is connected a mirror housing.

It is known to use a photodiode, connected to the dashboard of the vehicle, for controlling the air conditioning device off a motorized vehicle. The photodiode senses the solar radiation entering the interior of the vehicle through the windshield. The photodiode sends a corresponding signal to the control unit of the air conditioning device which thus is operated by taking into account the solar radiation. The photodiode must be mounted independently on the dashboard of the motorized vehicle and must be arranged such that the impinging solar radiation can be detected properly. Thus, the photodiode is visible on the dashboard and presents a visual distraction.

It is therefore an object of the present invention to design the interior of a motorized vehicle such that the sensor for sensing the solar radiation can be mounted in a simple manner, that, on the one hand, it reliably senses or detects the solar radiation, and, on the other hand, is mounted such within the interior of the motorized vehicle that it is not visible to passengers and the driver.

SUMMARY OF THE INVENTION

The interior rearview mirror for a motorized vehicle according to the present invention is primarily characterized by:

A mirror housing with a mirror member;

A mirror support connected to the mirror housing; and

At least one sensor for sensing solar radiation entering the interior of the motorized vehicle through the windshield, the sensor coupled to a control unit of an air conditioning device of the motorized vehicle.

Preferably, the interior rearview mirror further comprises a cover connected to the mirror support, wherein the at least one sensor is positioned at the cover.

Advantageously, the cover comprises a holder to which the at least one sensor is connected.

Expediently, the holder has an opening into which the sensor is placed.

Preferably, the interior rearview mirror further comprises a cover element transmissive to solar radiation, wherein the sensor is positioned under the cover element.

Advantageously, the cover element is made of a transparent material.

Preferably, the cover comprises at least one cover portion angularly positioned relative to the holder and covering the underside of the mirror support.

Advantageously, the at least one cover portion and the holder form a unitary part.

The holder preferably extends upwardly from the cover portion.

Preferably, the cover is secured at the mirror support with a snap connection.

Advantageously, the sensor is a photodiode (light-sensitive diode).

The inventive interior rearview mirror is provided with a sensor and the rearview mirror is mounted with its mirror support in the area of the windshield in the interior of the vehicle either directly to the windshield or to the roof of the passenger compartment of the motorized vehicle.

Thus, the sensor can be easily mounted at the interior rearview mirror such that the solar radiation impinging through the windshield into the passenger compartment can be detected without the sensor being visible to the passengers or the driver.

Advantageously, the sensor is connected to a cover of the mirror support. With this measure, the position of the sensor is independent of the adjustment of the mirror housing. It is thus possible to retrofit already existing interior rearview mirrors with such a cover. The cover is advantageously provided with a holder for the sensor to which holder the sensor can be easily mounted.

Advantageously, the holder of the cover has an opening into which the sensor can be inserted.

In order to protect the sensor against damage, it is advantageously protected by a cover element transmissive for solar radiation and preferably made of a transparent material.

In order to be able to mount the sensor in a favorable position at the windshield, the holder extends preferably at an angle (angularly) to at least one cover portion which covers the underside of the mirror support. This holder extends preferably upwardly from the cover portion so that it can be arranged in the direct vicinity of the windshield of a motorized vehicle. The sensor is then positioned, optionally with the cover element mounted above, directly at the windshield or has only a very short distance to it.

The holder and the cover portion are preferably formed as a unitary part so that the cover can be easily and inexpensively manufactured.

In order to allow for a simple mounting and demounting of the cover, it is advantageous to provide a snap connection for fastening the cover to the mirror support. Thus, it is possible without problems to exchange the sensor, if needed.

The sensor is preferably in the form of a photodiode (light-sensitive diode).

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
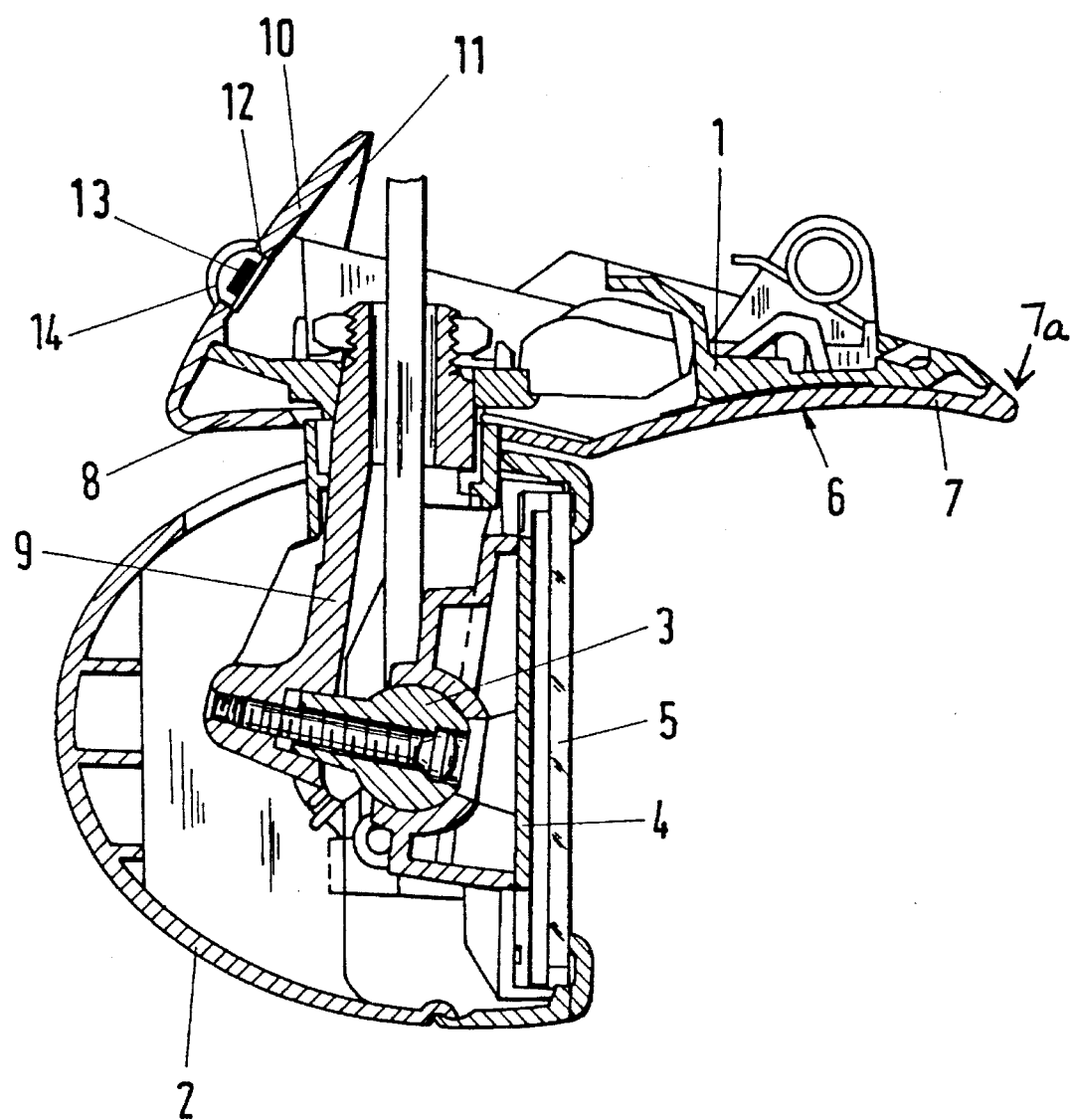
FIG. 1 shows a section of the inventive interior rearview mirror of a motorized vehicle.
Figure 2:
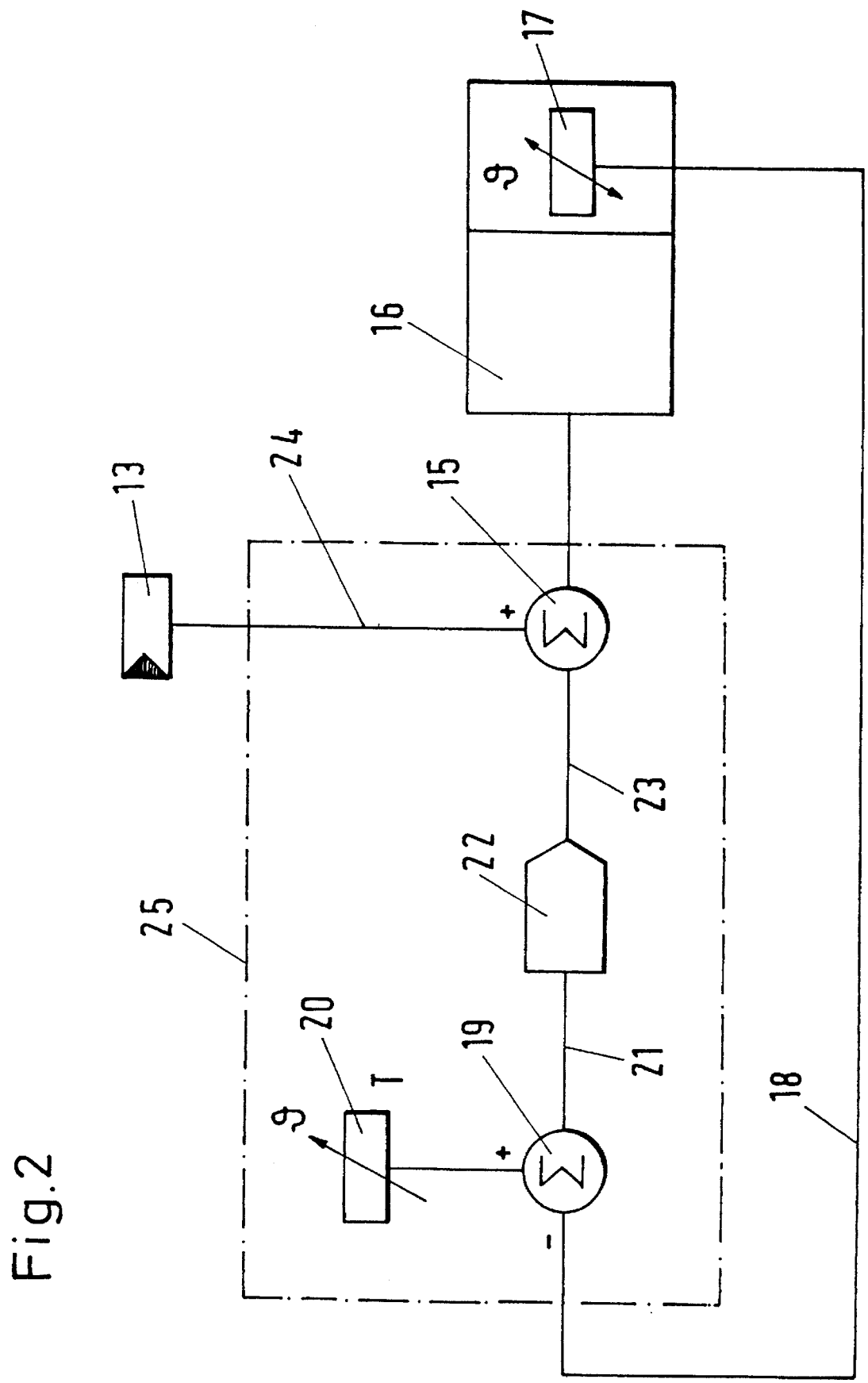
FIG. 2 shows a schematic representation of a circuit diagram for controlling the air-conditioning device of a motorized vehicle.

The present invention will now be described in detail with the aid of several specific embodiments utilizing FIGS. 1 and 2.

The interior rearview mirror comprises a mirror support 1 with which the interior rearview mirror is connected, in a manner known per se, to the motorized vehicle. The mirror housing 2 is pivotably connected with a ball-and-socket joint 3 to the mirror support 1. The mirror housing 2 is provided with a mirror holder 4 to which the mirror member 5 is connected.

The mirror support 1 is positioned above a cover 6. The cover comprises a cover portion 7 which, in a preferred embodiment, is connected with a snap connection 7a to the mirror support 1. The cover portion 7 is preferably plate-shaped and convexely curved. At the level of the mirror housing 2 the cover portion 7 has a transition into a cover portion 8 in the direction toward the non-represented windshield of the motorized vehicle. The cover portion 8 is located above the mirror housing 2. A holder 9 penetrates this forward cover portion 8. The holder 9 secures, in a manner known peruse, via the mirror holder 4 the mirror housing 2. In the direction toward the windshield the cover portion 8 has a transition into an upwardly extending holder 10. This holder 10 extends transverse to the direction of-travel of the motorized vehicle and is provided at its ends with sidewalls 11 that advantageously extend at a right angle to the plate-shaped holder 10.

The holder 10 comprises a receiving opening 12 in which the photodiode 13 is inserted. The photodiode 13 is positioned underneath a transparent cover element 14 that is preferably detachably connected to the holder 10. The photodiode 13 is arranged such at the windshield of the motorized vehicle that the solar radiation impinges the photodiode.

The photodiode 13 is part of a control circuit which will be explained in the following with the aid of FIG. 2. The photodiode 13 is a solar sensor that sends a signal to the comparator 15. The comparator 15 is connected to the air conditioning device which is provided with a temperature control member 17 for determining the actual temperature within the motorized vehicle. The signal for the actual temperature derived at this temperature control member is sent via line 18 to a comparator 19 which, in addition, receives the nominal temperature value selected with a temperature dial 20. As long as the actual temperature value supplied by the temperature control member 17 deviates from the nominal temperature value, a corresponding differential signal 21 is sent to a controller 22 which sends a corresponding control signal to the comparator 15. The comparator 15 receives from the photodiode 13 a signal 24 corresponding to the impinging solar radiation which is compared to the control signal 23. When the solar radiation is strong, a corresponding signal 24 is sent from the photodiode 13 to the comparator 15. The comparator 15 is designed such that upon strong solar radiation, i.e., for a correspondingly great signal value 24, the air conditioning device 16 is controlled such that the temperature increase within the interior of the motorized vehicles that is to be expected due to the strong solar radiation is already taken into account. The signal 24 is thus overlapped by the control signal 23. If the control signal 23 were directly fed into the air conditioning device 16, the solar radiation would betaken into account with delay. Due to the overlap of the signal 24, the increased solar radiation is thus timely detected and the air conditioning device 16 is correspondingly controlled at an early point so that despite the strong solar radiation a warming of the interior of the motorized vehicle past the selected nominal temperature value adjusted with the temperature dial 20 will not be surpassed. When the solar radiation is low or not present, a correspondingly weak signal (or no signal) is sent to the comparator 15 so that in this case the air conditioning device 16 is directly controlled by the control signal 23.

The comparators 15, 19, the temperature dial 20, and the control unit 22 are positioned within a control device 25 that can be positioned within the motorized vehicle at any desired location. The photodiode 13 can be easily mounted at the holder 10 of the cover 6 of the mirror support 1. The photodiode 13 is not visible from the interior of the motorized vehicle so that it does not present a disturbing visual effect to the driver or the passengers. The photodiode 13 can be arranged at the windshield of the motorized vehicle in an optimized mounting position so that the solar radiation can be reliably detected through the windshield. For mounting the photodiode the already present interior rearview mirror of a motorized vehicle is selected as the mounting location so that within the interior of the motorized vehicle no additional mounting spaces must be provided for the photodiode. The photodiode 13 can be easily connected to the rearview mirror before mounting the rearview mirror.

The cover is advantageously snap-connected to the mirror support 1 so that it can be easily mounted and demounted, if needed. The electrical line from the control device 25 to the photodiode 13 can be arranged within the interior of the motorized vehicle in such a manner that it is not visible.

The present invention is, of course, in no way restricted to the specific disclosure of the specification and drawings, but also encompasses any modifications within the scope of the appended claims.

What we claim is:

1. An interior rearview mirror for a motorized vehicle, said mirror comprising:

a mirror housing with a mirror member;

a mirror support connected to said mirror housing;

at least one sensor for sensing solar radiation entering the interior of the motorized vehicle through a windshield, said sensor coupled to a control unit of an air conditioning device of the motorized vehicle;

a cover connected to said mirror support, wherein said at least one sensor is positioned at said cover;

said cover comprises a holder to which said at least one sensor is connected;

said cover comprises at least one cover portion angularly positioned relative to said holder and covering an underside of said mirror support.

2. An interior rearview mirror according to claim 1, wherein said holder has an opening into which said sensor is placed.

3. An interior rearview mirror according to claim 1, further comprising a cover element transmissive to solar radiation, wherein said sensor is positioned under said cover element.

4. An interior rearview mirror according to claim 3, wherein said cover element is made of a transparent material.

5. An interior rearview mirror according to claim 1, wherein said at least one cover portion and said holder are an unitary part.

6. An interior rearview mirror according to claim 1, wherein said holder extends upwardly through said cover portion.

7. An interior rearview mirror according to claim 1, wherein said cover is secured at said mirror support with a snap connection.

8. An interior rearview mirror according to claim 1, wherein said sensor is a photodiode.

\* \* \* \* \*